United States Patent
Guidry, Jr.

(10) Patent No.: US 8,322,556 B2
(45) Date of Patent: Dec. 4, 2012

(54) CLOSURE FOR A VESSEL

(75) Inventor: Michael J. Guidry, Jr., Hockley, TX (US)

(73) Assignee: Robbins & Myers Energy Systems L.P., Willis, TX (US)

( * ) Notice: Subject to any disclaimer, the term of this patent is extended or adjusted under 35 U.S.C. 154(b) by 0 days.

(21) Appl. No.: 13/233,522

(22) Filed: Sep. 15, 2011

(65) Prior Publication Data

US 2012/0000055 A1    Jan. 5, 2012

Related U.S. Application Data

(62) Division of application No. 11/809,765, filed on Jun. 1, 2007, now Pat. No. 8,052,006.

(51) Int. Cl.
*B65D 41/38* (2006.01)

(52) U.S. Cl. ......... 220/298; 220/813; 220/378; 277/628

(58) Field of Classification Search .................. 220/298, 220/299, 300, 301, 316, 324, 378, 787, 800, 220/825; 277/628, 637, 641, 642
See application file for complete search history.

(56) References Cited

U.S. PATENT DOCUMENTS

| | | | |
|---|---|---|---|
| 2,349,389 A | 5/1944 | Thompson |
| 2,627,361 A | 2/1953 | Zerbe |
| 2,721,094 A | 10/1955 | Webster |
| 2,883,084 A | 4/1959 | Shankland |
| 3,107,810 A | 10/1963 | King |
| 3,449,860 A | 6/1969 | Franks, Jr. et al. |
| 3,531,011 A | 9/1970 | Wolfe |
| 3,667,649 A | 6/1972 | Thillet |
| 3,765,562 A | 10/1973 | Shulz |
| 3,804,288 A | 4/1974 | Piegza |
| 4,140,240 A | 2/1979 | Platts |
| 4,519,519 A | 5/1985 | Meuschke et al. |
| 5,148,938 A | 9/1992 | Morgan, Jr. |
| 6,439,415 B1 | 8/2002 | Salim et al. |
| 7,036,674 B2 | 5/2006 | McGuire |
| 7,051,897 B2 | 5/2006 | McGuire |
| 8,052,006 B2 | 11/2011 | Guidry, Jr. |

*Primary Examiner* — Anthony Stashick
*Assistant Examiner* — James N Smalley
(74) *Attorney, Agent, or Firm* — Streets & Steele

(57) ABSTRACT

A closure 10 is provided for retaining fluid pressure within a vessel, and comprises a hub 12 having an access opening to the vessel, with the hub having a circumferential stop 17 and one or more recesses 50 each extending radially outward from an adjacent inner surface 26 of the hub. A door 22 is positioned between the stop surface and the vessel, and a latch member 30 brings the door into sealing engagement with the stop member. One or more lugs 24 each extend radially outward from an exterior surface of the door, such that a respective lug engages the hub about a respective recess to seal the door to the hub, while the door may be moved to pass through the one or more recesses and out of the hub.

15 Claims, 8 Drawing Sheets

# CLOSURE FOR A VESSEL

CROSS-REFERENCE TO RELATED APPLICATION

This application is a divisional of U.S. application Ser. No. 11/809,765 filed on Jun. 1, 2007, the disclosure of which is incorporated herein by reference for all purposes.

FIELD OF THE INVENTION

The present invention relates to closures of the type commonly used to retain pressure within a vessel, whether that be a tank or a pipeline. More particularly, the invention relates to a fast opening and highly reliable closure.

BACKGROUND OF THE INVENTION

Various types of closures have been devised, and many closures vary considerably in design depending upon the size of the closure and the pressure rating to which the closure is subjected. Closures are desirably fast opening and closing, and provide a reliable seal to maintain pressure within the vessel. Most closures are of the type wherein the door is threaded or otherwise mechanically secured to a hub, and is sealed to hold pressure. The internal pressure acts to push the door away from the hub, which may reduce sealing effectiveness.

A rather complicated closure mechanism is disclosed in U.S. Pat. No. 6,439,415. U.S. Pat. No. 5,148,938 discloses an exterior stop, and a simple interference seal between the interior of the housing and the exterior of the door. U.S. Pat. No. 4,519,519 discloses a door with a stop exterior of the door, and a seal between the interior of the door and the body of the vessel. U.S. Pat. No. 2,721,094 discloses keys which move radially to lock the door in place or release the door. U.S. Pat. Nos. 7,051,897 and 7,036,674 disclose other embodiments of closures for a pressure vessel. Prior art closures of this type are generally expensive, and these closures frequently have detractions which have limited their use and acceptance.

Various closures have been designed which utilize a door interior of a stop on the hub. This design thus utilizes internal pressure to press the door tighter against a stop. U.S. Pat. No. 3,667,649 discloses a design wherein the stops are removable. U.S. Pat. No. 3,449,860 discloses a door with retractable stops. U.S. Pat. No. 4,140,240 discloses a closure with stops external to the door.

The disadvantages of the prior art are overcome by the present invention, and an improved closure is hereinafter disclosed.

SUMMARY OF THE INVENTION

In one embodiment, a closure for a vessel comprises a hub having a access opening to the vessel, with the hub having a circumferential stop face and at least one recess extending radially outward from an adjacent outer surface of the hub. A door may be positioned between the stop face and the vessel, and a latch mechanism is provided for bringing the door into secure engagement with the stop face. A lug extends radially outward from an adjacent exterior surface of the door, such that a respective lug engages the hub in the vicinity of a respective recess when the door is sealed to the hub. The door may be moved out through the hub and between the one or more recesses.

These and further features and advantages of the present invention will become apparent from the following detailed description, wherein reference is made to the figures in the accompanying drawings.

DETAILED DESCRIPTION OF PREFERRED EMBODIMENTS

Figure 1:
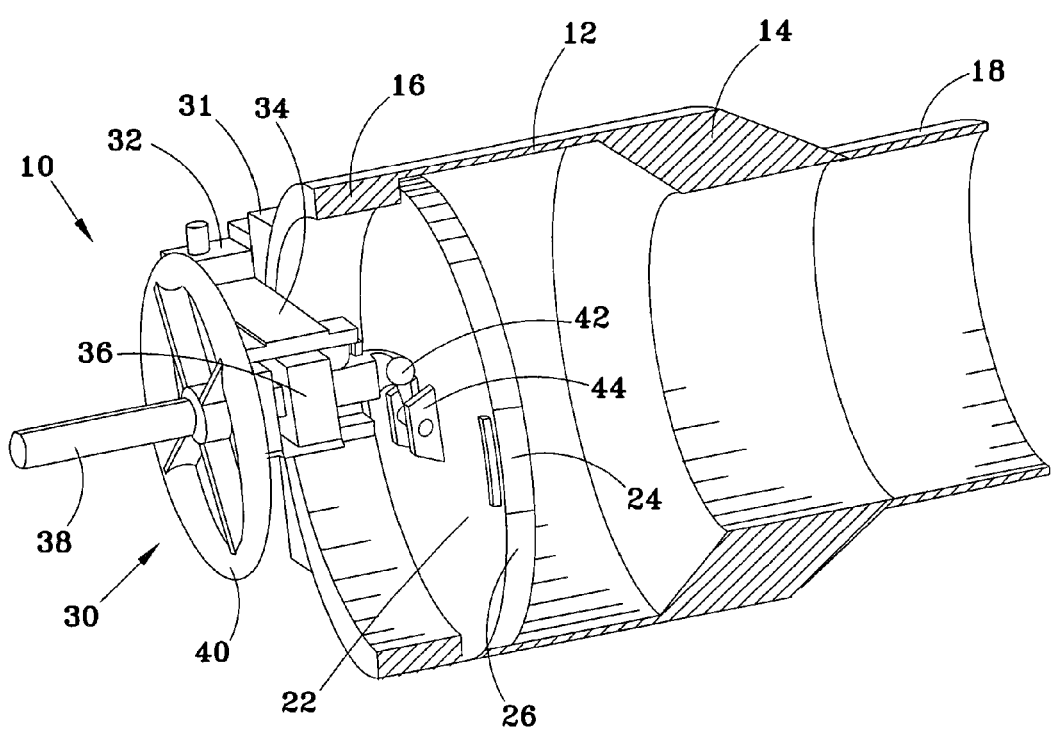
FIG. 1 is a pictorial view, partially in cross-section, of a suitable closure according to the present invention.

FIG. 1 illustrates one embodiment of a closure 10 according to the present invention. The closure includes a hub 12 having an access opening to the vessel, with this access opening generally being sufficiently large to accommodate a worker for access to the vessel, or sufficiently large to receive a pig for passing through a pipeline. FIG. 1 generally illustrates the hub 12 in sealed engagement with a portion of a generic vessel 18, which may be a pressurized tank or a pipeline, depending on the application.

Figure 2:
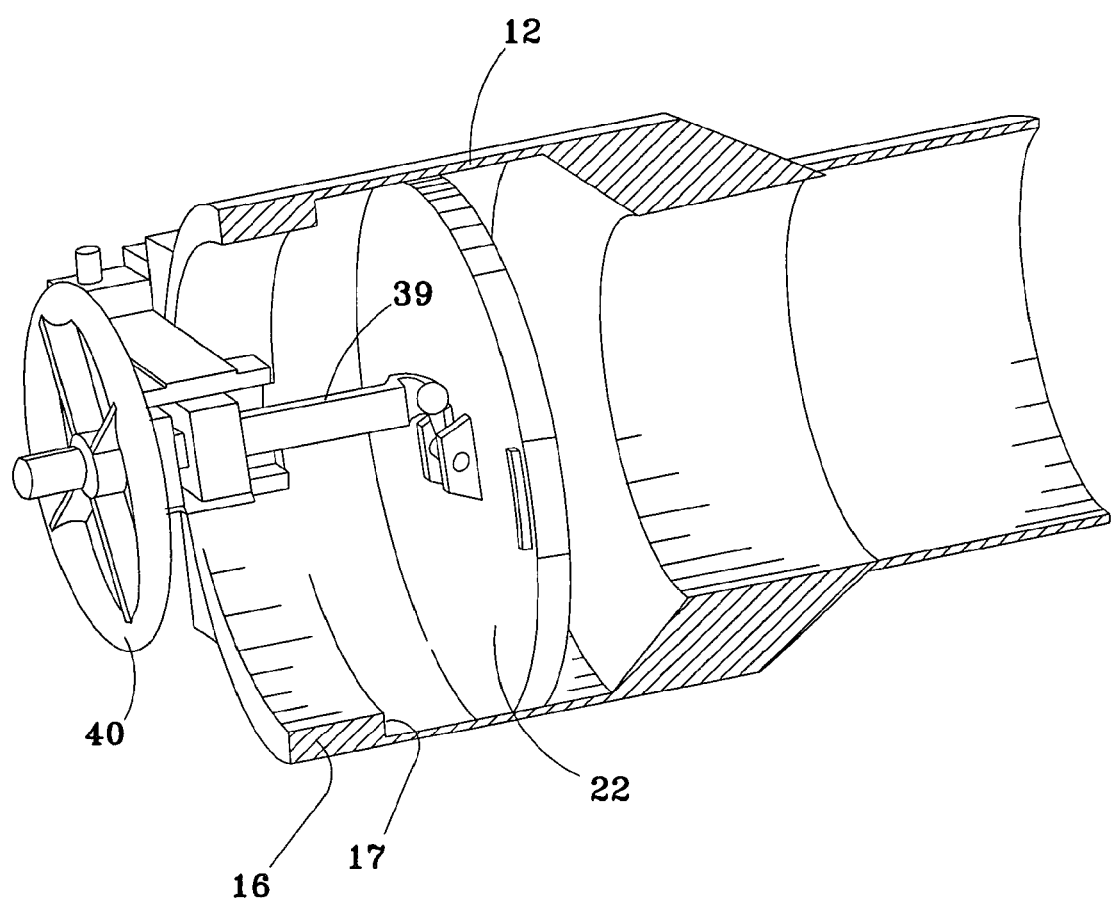
FIG. 2 illustrates the closure of FIG. 1 with the door moved out of engagement with the stop surface.
Figure 5:
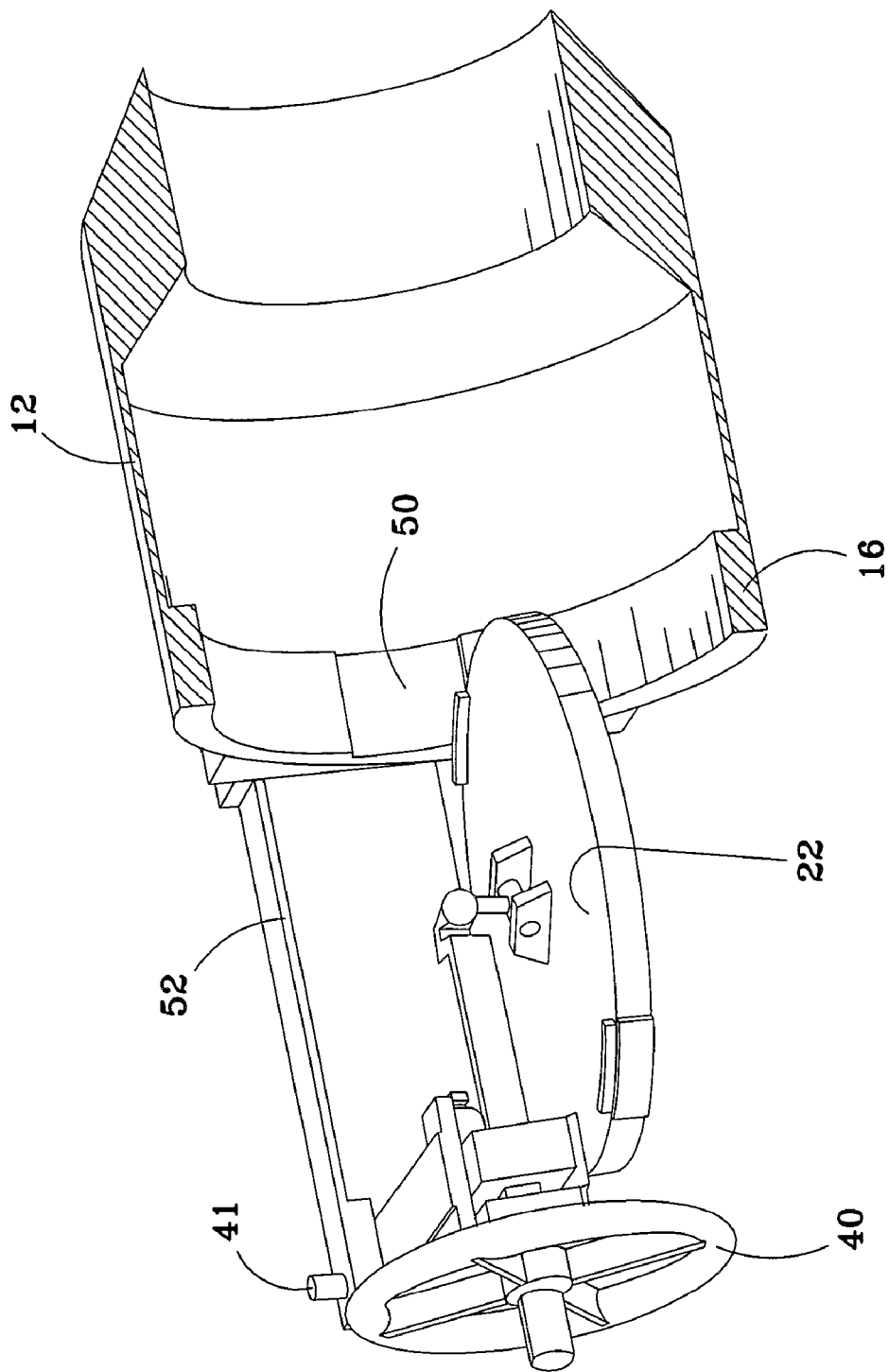
FIG. 5 illustrates the door being moved through the slots and out of the hub.

The hub 12 has a circumferential stop surface 17, as shown in FIG. 2, and a plurality of recesses 50, with one of the recesses shown in FIG. 5. Those skilled in the art will appreciate that in a preferred embodiment the closure may be symmetrical, and thus another recess 50 is provided at a position circumferentially opposite the recess shown in FIG. 5. Each of the plurality of recesses 50 extend generally radially outward from the adjacent inner surface of the hub.

The enclosure also includes a door 22 for positioning between the stop surface 17 and the vessel. A latch member 30, which may be of various varieties, is provided for bringing the door into sealing engagement with the stop surface. One or more lugs 24 each extend radially outward from an adjacent exterior surface 26 of the door, such that a respective lug engages the hub about a respective recess to seal the door to the hub. The lugs 24 move generally outward into a recess when in a locked position, and move generally inward to an unlocked position. The recesses 50 may extend generally outward to receive the lugs, but the central axis of each recess need not necessarily be in the radial direction. As explained subsequently, the door may be moved to pass through the plurality of recesses and out of the hub.

Figure 7:
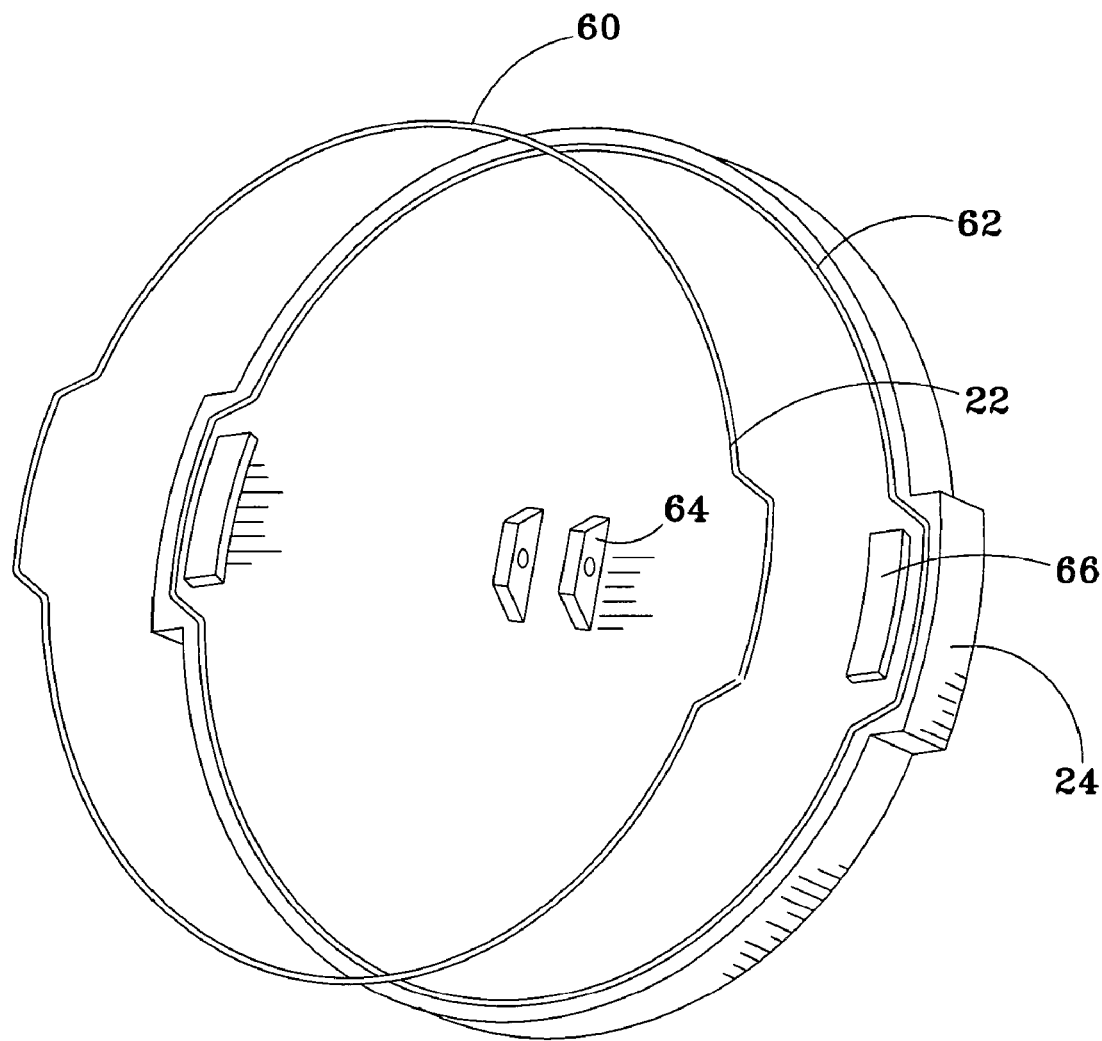
FIG. 7 illustrates a seal and a receiving groove in the door.

FIG. 1 illustrates the door 22 seated against the stop surface 17 of the hub. The door may be held in this position by tightening the wheel 40 on the threaded locking bar 38. The locking mechanism holds the door in position while the door is at a low system pressure. As system pressure increases, the pressure itself will hold the door in place with sufficient force to prevent accidental opening while the closure is in use. As shown in FIG. 7, an elastomeric seal 60 may be provided for fitting within a corresponding groove 62 in the door 22. Various types of seals may be provided, including metal or polymeric seals, and either gasket or lip seals, with the slip ? seals preferably being pressure energized. The seal is preferably annular, i.e., its path is over a circumferential length of 360°, although the configuration of the seal along this length need not be circular.

FIG. 1 illustrates an annular restriction 14 in the hub, which may be provided for various purposes. The outward end of the hub includes an annular stop member 16 which includes the stop face 17 previously described. Still referring to FIG. 1, a slidable mount 31 may be supported on to the hub 12, and may support block 32 thereon at a forward end of the slidable mount 31. Arm 34 extends radially inward from block 32, and supports a central block 36 to which the threaded rod 38 may be rotated, thus moving the pivot member 42 which is pivotally connected at one end to locking bar 39 and the other end to mounting bracket 44 on the door.

Figure 3:
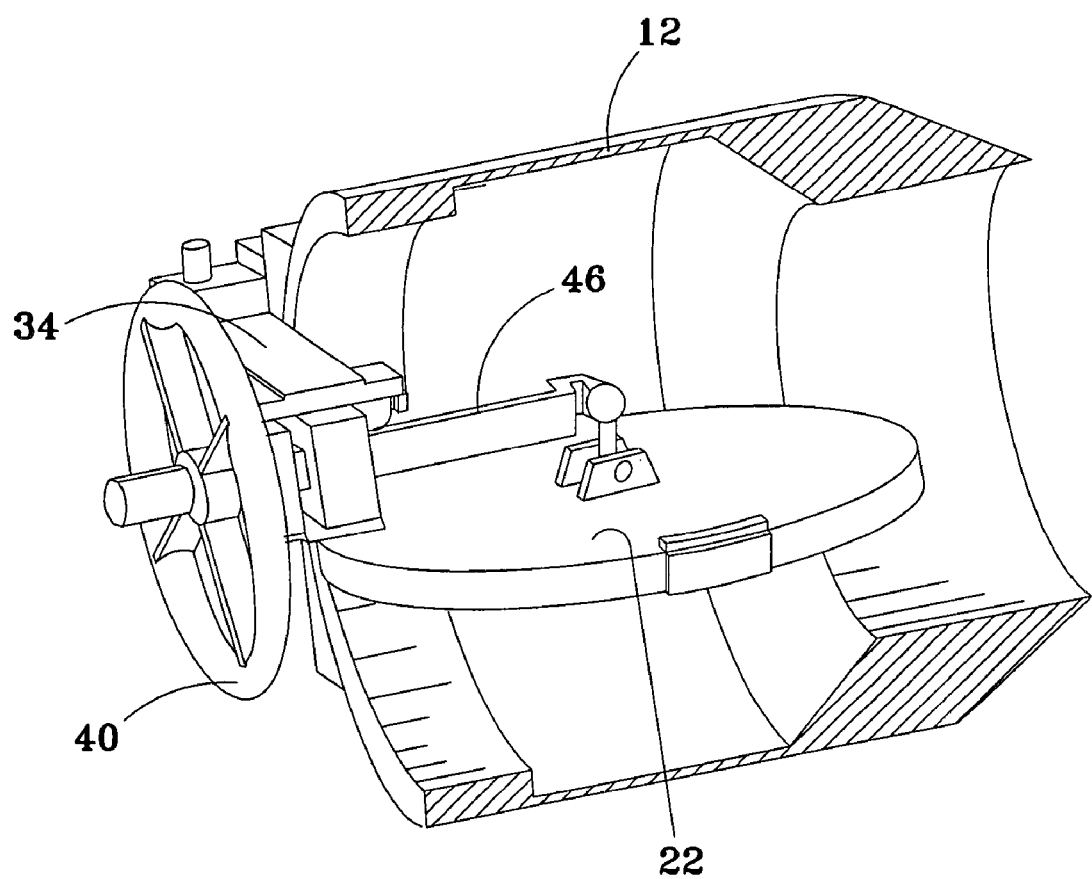
FIG. 3 illustrates the closure of FIG. 2 with the door in a pivoted position.
Figure 4:
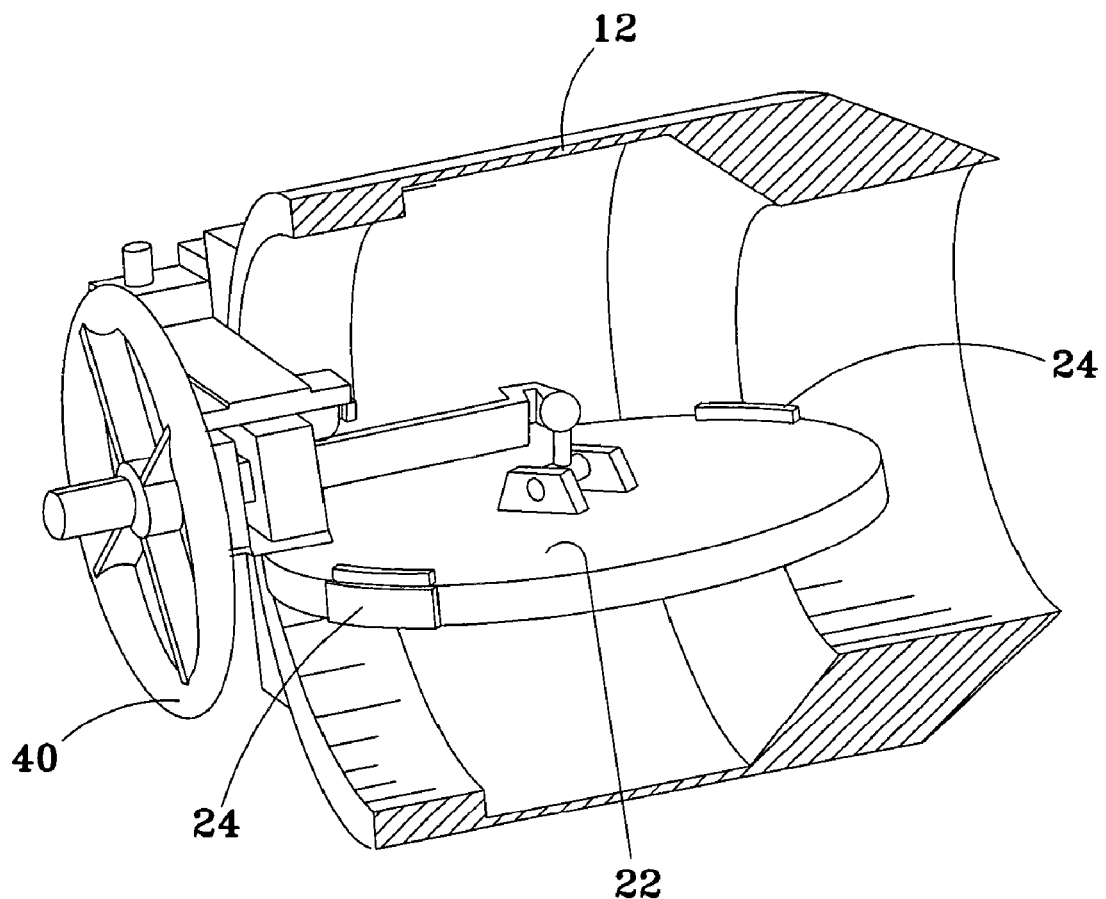
FIG. 4 illustrates the door pivoted such that the lugs are rotated from the FIG. 3 position.

The closure 10 can be opened after system pressure has been equalized to ambient. Referring to FIG. 2, the centerline of the locking bar 39 is preferably above the center of gravity of the door to provide natural stability. The hand crank 40 may be rotated so that the locking bar 38 and the door 12 are moved away from the stop surface 17. A simple bar may then be used to apply a slight force to the upper part of the door, so that the door is rotated to a substantially horizontal position, as shown in FIG. 3. While in this position, the lugs 24 may still be aligned with the recesses 50. In order to remove the door, the door 22 and the lugs 24 may be rotated, as shown in FIG. 4, so that the lugs 24 are out of alignment with the slots 50. The door may then be easily passed through the slots 50 and out of the hub, as shown in FIG. 5, after releasing a locking member to allow sliding movement of mount 32. The door is preferably balanced during this operation to allow ease of handling, and small jack systems may be used for doors which are heavy.

Figure 6:
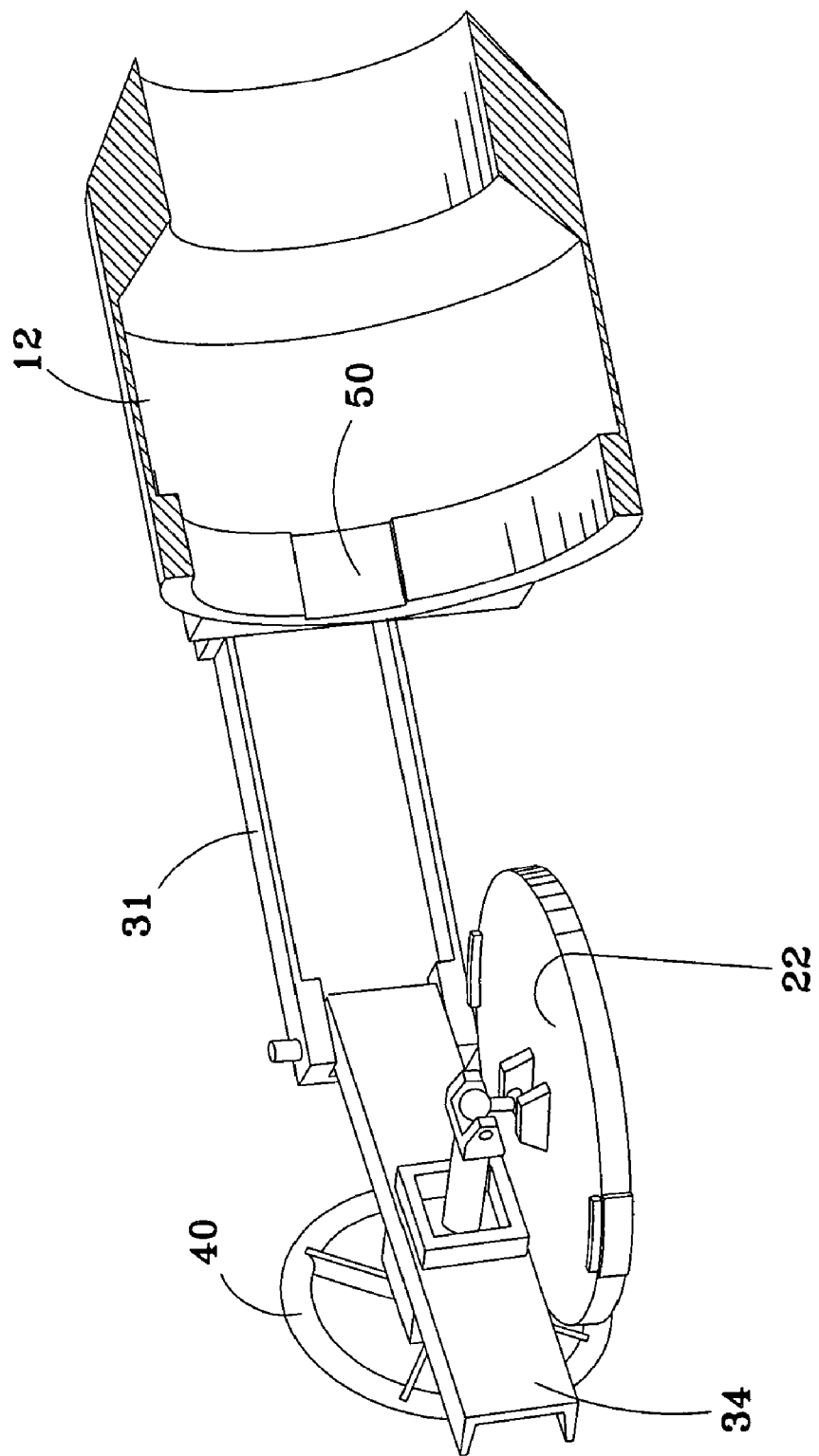
FIG. 6 illustrates the door positioned outside the hub for easy access.

Once the door has passed through the recesses 50, the door may be completely removed from the hub access by pulling on the sliding mount 32, so that the mount 32 is moved outward from the position as shown in FIG. 4 to the position as shown in FIG. 5. After a locking pin is disengaged, the door may be moved out of the way by pivoting the swing arm 34 from the sliding mount 32, as shown in FIG. 6. This allows easy access to the door for repair or maintenance operations. The door may be deployed in the closed position by reversing these steps.

As shown in FIG. 7, a sealing element 60 may be provided within a gland or slot 62 in the door. Alternatively, the seal may be supported on the hub rather than the door. Sealing is assured when the door is in the closed position, since the seal moves axially to engage the stop surface, which is outward of the respective recess 50. Alignment lug 66 may be provided for assuring that the door is properly oriented with respect to the hub when closed.

Figure 8:
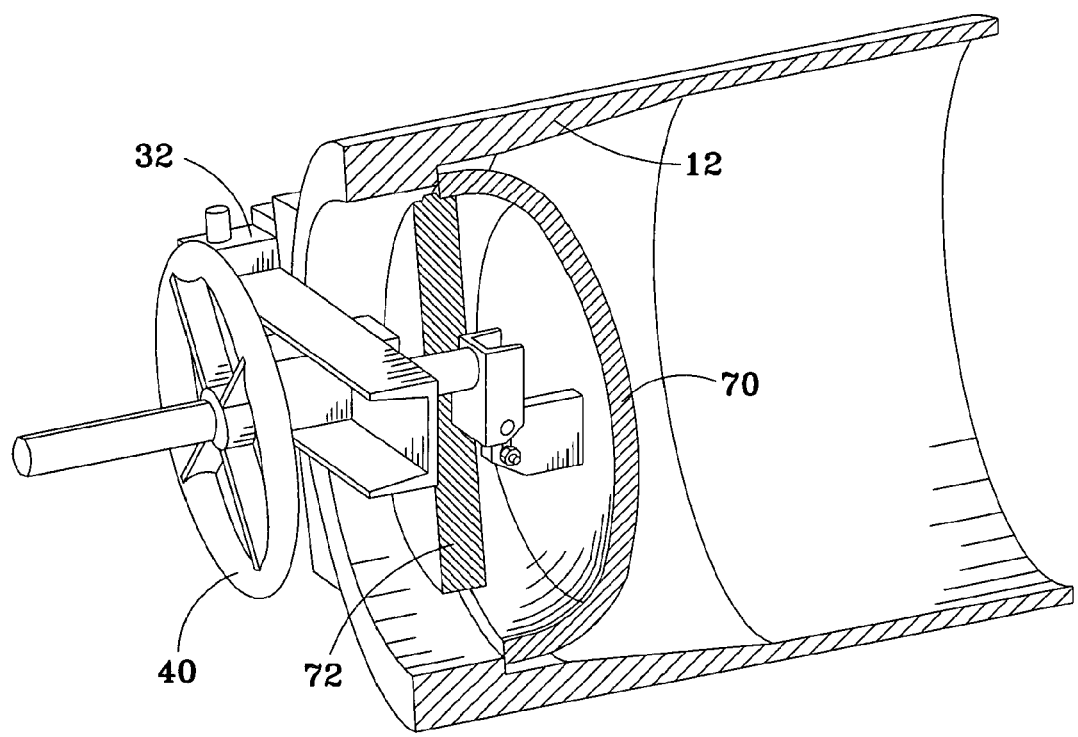
FIG. 8 discloses an alternate embodiment wherein at least a portion of the door is elliptical shaped.

An alternate embodiment invention is shown in FIG. 8. In this embodiment, the door 70 has an elliptical or dome portion 70. This design allows the door to be hung at its center of gravity and requires less mass than a flat door for a given pressure load. The counterweight block also provides a door support 72, as shown in FIG. 8, although sealing engagement is preferably with the portion of the door that includes the elliptical shaped body 70. High and low pressure versions of the closure are possible with a minimum change in the design, and with no inherent change required in the hinging and locking mechanisms.

For each of the embodiments, the center of the gravity of the door may be adjusted by adding counterweights, which may also be used for structural reinforcement. The door is preferably hung at or near the center of gravity for balance and ease of orientation, thereby allowing even heavy doors to be handled without use of powered mechanical equipment. The door preferably is hung so that its center of gravity is on, or is closely adjacent to, the centerline of the hub opening at all door travel positions. Preferably there is no need to raise or lower the door during operation of the closure.

The closure of the invention is also inherently safe, and would practically require failure or rupture of the door or the hub. The closure also does not require high manufacturing tolerances, thereby resulting in a relatively low manufacture cost.

Those skilled in the art will appreciate that the closure of the present invention is relatively fast in opening and closing, and that the operation of the closure need not depend upon the closure size or pressure rating. In a preferred embodiment, the closure provides a 360° face seal, which may be a simple compression seal or a lip-type seal. A significant feature of the invention is that the closure is secured in the closed position by internal pressure within the vessel. Various embodiments allow the operator to easily manipulate doors, including heavy doors, with relative ease.

In a preferred embodiment, the door has a generally circular configuration, with that configuration interrupted only by the one or more lugs. Providing two such lugs and two corresponding slots radially opposing each other are preferred for many applications since the design is then balanced. It would be possible, however, to utilize a closure of the invention with a single slot and a single lug, although the center of the door may have to be moved laterally to pass out through the single slot. In yet other embodiments, the door could be provided which did not have a generally circular configuration, and instead had a oval or elliptical configuration. Pivoting of the door after axial movement would thus allow an elliptical door to pass out through the hub without the use of a lug or a corresponding recess.

Those skilled in the art will appreciate the terms "slots" or "recesses" when referring to the opening in the hub and the term "lug" when dealing with the outwardly extending projections on the door are intended in their broadest sense. Lugs may also be termed ears, stops, projections, or tabs. Utilizing two recesses and two corresponding lugs facilitates ease of operating the closure.

The closure of the present invention is particularly well suited for applications involving relatively high pressures, i.e., pressures in excess of 5,000 psi. Increased pressure forces the door into tighter engagement with the stop surface, which increases the sealing effectiveness of the closure. The lugs extend radially outward from the generally circular periphery of the door, although the centerline of each lug extension may include a circumferential segment, so that the centerline of the lug is spaced from the centerline of the hub.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A method of forming a closure for a vessel, comprising:
providing a hub having an access opening to the vessel, the hub having a circumferential stop face spaced between the access opening and the vessel and one or more recesses each extending radially outward from an adjacent inner surface of the hub;

positioning a door between the stop face and the vessel, such that fluid pressure in the vessel forces the door against the stop face;

providing an annular seal for sealing between the door and the stop face;

forming one or more of lugs each extending radially outward from an adjacent exterior surface of the door, such that during opening of the closure a respective lug passes through a respective recess in the hub and a portion of the annular seal extends radially outward of the door and circumferentially along a respective lug to seal the lug to the hub;

moving the door into sealing engagement with the stop face; and pivoting the door to pass the door and the one or more lugs through the one or more recesses and out of the hub.

2. A method as defined in claim 1, further comprising:
selecting the annular seal from one of a metal seal, an elastomeric seal, and a polymeric seal.

3. A method as defined in claim 1, further comprising:
suspending the door while within the hub closely adjacent its center of gravity.

4. A method as defined in claim 1, further comprising:
forming an exterior surface of the door without the plurality of lugs to have a generally circular configuration.

5. A method as defined in claim 1, wherein the circumferential stop face is fixedly positioned on the hub.

6. A method as defined in claim 1, wherein each of the one or more of lugs is fixedly positioned on the door.

7. A method as defined in claim 1, wherein the one or more recesses and the one or more lugs includes at least two circumferentially opposite recesses and at least two circumferentially opposite lugs.

8. A method of forming a closure for a vessel, comprising:
providing a hub having an access opening to the vessel, the hub having a circumferential stop face spaced between the access opening and the vessel and a plurality of recesses each extending radially outward from an adjacent inner surface of the hub;

positioning a door between the stop face and the vessel, such that fluid pressure in the vessel forces the door against the stop face;

providing an annular seal for sealing between the door and the stop face;

providing a latch member for bringing the door to sealing engagement with the stop face, such that fluid pressure in the vessel forces the door against the stop face;

forming a plurality of lugs each extending radially outward from an adjacent exterior surface of the door, such that during opening of the closure a respective lug passes through a respective recess in the hub and a portion of the annular seal extends radially outward of the door and circumferentially along a respective lug to seal between the respective lug and the hub; and pivoting the door to pass the door and the plurality of lugs through the plurality of recesses and out of the hub.

9. The method as defined in claim 8, further comprising:
pivoting the door with respect to the hub.

10. The method as defined in claim 8, wherein the door is suspended closely adjacent its center of gravity.

11. The method as defined in claim 8, further comprising:
forming an exterior surface of the door without the plurality of lugs to have a generally circular configuration.

12. The method as defined in claim 8, further comprising:
fixing the circumferential stop face on the hub.

13. The method as defined in claim 8, further comprising:
fixing each of the plurality of lugs on the door.

14. The method as defined in claim 8, further comprising:
selecting the annular seal from one of a metal seal, an elastomeric seal, and a polymeric seal.

15. The method as defined in claim 8, wherein the plurality of recesses and the plurality of lugs includes at least two circumferentially opposite recesses and at least two circumferentially opposite lugs.

\* \* \* \* \*